(12) United States Patent
Kim et al.

(10) Patent No.: US 11,487,497 B2
(45) Date of Patent: Nov. 1, 2022

(54) AUDIO OUTPUT DEVICE AND METHOD FOR CONTROLLING OUTPUT SPEED OF AUDIO DATA THEREOF

(71) Applicant: Samsung Electronics Co., Ltd., Gyeonggi-do (KR)

(72) Inventors: Hyunwook Kim, Gyeonggi-do (KR); Sangsoo Park, Gyeonggi-do (KR); Hangil Moon, Gyeonggi-do (KR); Hyunchul Yang, Gyeonggi-do (KR); Sanghoon Lee, Gyeonggi-do (KR); Kalicharan Gajula, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/148,694

(22) Filed: Jan. 14, 2021

(65) Prior Publication Data

US 2021/0224028 A1 Jul. 22, 2021

(30) Foreign Application Priority Data

Jan. 17, 2020 (KR) .................. 10-2020-0006726

(51) Int. Cl.
*G06F 3/16* (2006.01)

(52) U.S. Cl.
CPC .......... *G06F 3/165* (2013.01); *H04R 2420/07* (2013.01)

(58) Field of Classification Search
CPC ..................... G06F 3/165; H04R 2420/07
See application file for complete search history.

(56) References Cited

U.S. PATENT DOCUMENTS

| | | |
|---|---|---|
| 8,103,015 B2 | 1/2012 | Meyer et al. |
| 10,764,670 B2 | 9/2020 | Lindahl |
| 2015/0208106 A1 | 7/2015 | Bieger et al. |

(Continued)

FOREIGN PATENT DOCUMENTS

| | | |
|---|---|---|
| GN | 108551358 A | 9/2018 |
| KR | 10-2017-0018604 A | 2/2017 |
| KR | 10-2018-0000163 A | 1/2018 |

OTHER PUBLICATIONS

International Search Report dated Apr. 15, 2021.

*Primary Examiner* — Joseph Saunders, Jr.
(74) *Attorney, Agent, or Firm* — Cha & Reiter, LLC

(57) ABSTRACT

An audio output device according to an embodiment may include: a short-range communication module configured to perform short-range wireless communication; a memory configured to buffer audio data received from an external electronic device through the short-range communication module; an audio output unit configured to output the audio data; and a processor. The processor may be configured to: receive operation mode information related to a function being executed in the external electronic device from the external electronic device through the short-range communication module; configure a reference period corresponding to an amount of the audio data buffered in the memory based on the operation mode information; and determine a playback speed of the audio data to be output through the audio output unit by comparing the amount of the buffered audio data with the configured reference period. In addition, various other embodiments may be possible.

20 Claims, 16 Drawing Sheets

(56) References Cited

U.S. PATENT DOCUMENTS

2016/0112787 A1 4/2016 Rich et al.
2019/0373032 A1* 12/2019 Kumar .................... H04L 65/80
2019/0373490 A1* 12/2019 Rahmati ................. H04W 4/50

* cited by examiner

AUDIO OUTPUT DEVICE AND METHOD FOR CONTROLLING OUTPUT SPEED OF AUDIO DATA THEREOF

CROSS-REFERENCE TO RELATED APPLICATION(S)

This application is based on and claims priority under 35 U.S.C. 119 to Korean Patent Application No. 10-2020-0006726, filed on Jan. 17, 2020, in the Korean Intellectual Property Office, the disclosure of which is herein incorporated by reference in its entirety.

BACKGROUND

1) Field

One or more embodiments disclosed herein generally relate to an audio output device and, more particularly, to an audio output device capable of outputting audio data transmitted from an external electronic device via wireless communication. The embodiments also relate to an output speed control method of the audio output device.

2) Description of Related Art

With the development of mobile communication and hardware/software technologies, portable electronic devices (hereinafter, electronic devices) such as smartphones can implement various functions. Electronic devices can provide users with various user experiences by installing and executing various applications. Electronic devices can provide sounds generated from various applications for users using audio accessories connected via a wire or wirelessly. Recently, trends in audio accessories have been moved from wired connections to wireless connections. For example, earphones, headphones, earbuds, speakers, and the like which are connected to the electronic device through short-range wireless communication, such as Bluetooth, are being used.

Such an audio accessory may include a buffer memory and may output audio data received from the electronic device in the manner of first-in-first-out. Here, the audio accessory may accumulate a certain level of audio data in the buffer memory in order to prevent sound interruption. Specifically, when the electronic device streams audio data to the wireless audio accessory, the audio accessory may store a specified amount of the audio data in the buffer memory rather than immediately outputting the audio data, and may then output audio data when the specified amount of audio data is accumulated.

The above information is presented as background information only to assist with an understanding of the disclosure. No determination has been made, and no assertion is made, as to whether any of the above might be applicable as prior art with regard to the disclosure.

SUMMARY

Wireless audio accessories do not have the disadvantages of wired audio accessories but need to overcome the problem of sound interruption in a wireless environment and latency in synchronization and real time between the sound provided by an audio accessory and when a video is provided by an electronic device.

For example, the amount of audio data stored in a buffer memory may be configured to be high, which may be advantageous to resolving sound interruption but which may cause the audio and the video displayed by the electronic device to be desynchronized due to greater latency time. On the contrary, the amount of buffered audio data may be configured to be low, which may be disadvantageous to resolving sound interruption.

Aspects of certain embodiments disclosed herein is to provide an audio output device capable of being optimized for sound interruption and/or latency, and an audio output speed control method thereof.

An audio output device according to an embodiment may include: a short-range communication module configured to perform short-range wireless communication; a memory configured to buffer audio data received from an external electronic device through the short-range communication module; an audio output unit configured to output the audio data; and a processor operatively connected to the short-range communication module, the memory, and the audio output unit, wherein the processor may be configured to: receive operation mode information related to a function being executed in the external electronic device from the external electronic device through the short-range communication module; configure a reference period corresponding to the amount of the audio data buffered in the memory based on the operation mode information; and determine the playback speed of the audio data to be output through the audio output unit by comparing the amount of the buffered audio data with the configured reference period.

A method for controlling an audio output speed according to an embodiment may include: receiving operation mode information related to a function being executed in an external electronic device from the external electronic device through short-range communication; configuring a reference period corresponding to the amount of audio data buffered in a memory based on the operation mode information; and determining the playback speed of the audio data to be output through an audio output unit by comparing the amount of the buffered audio data with the configured reference period.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Certain embodiments disclosed herein may provide an audio output device capable of being optimized for sound interruption and/or latency by dynamically adjusting the capacity of a buffer memory based on the operation mode of an electronic device wirelessly providing audio data, and an audio output speed control method thereof.

Figure 1:
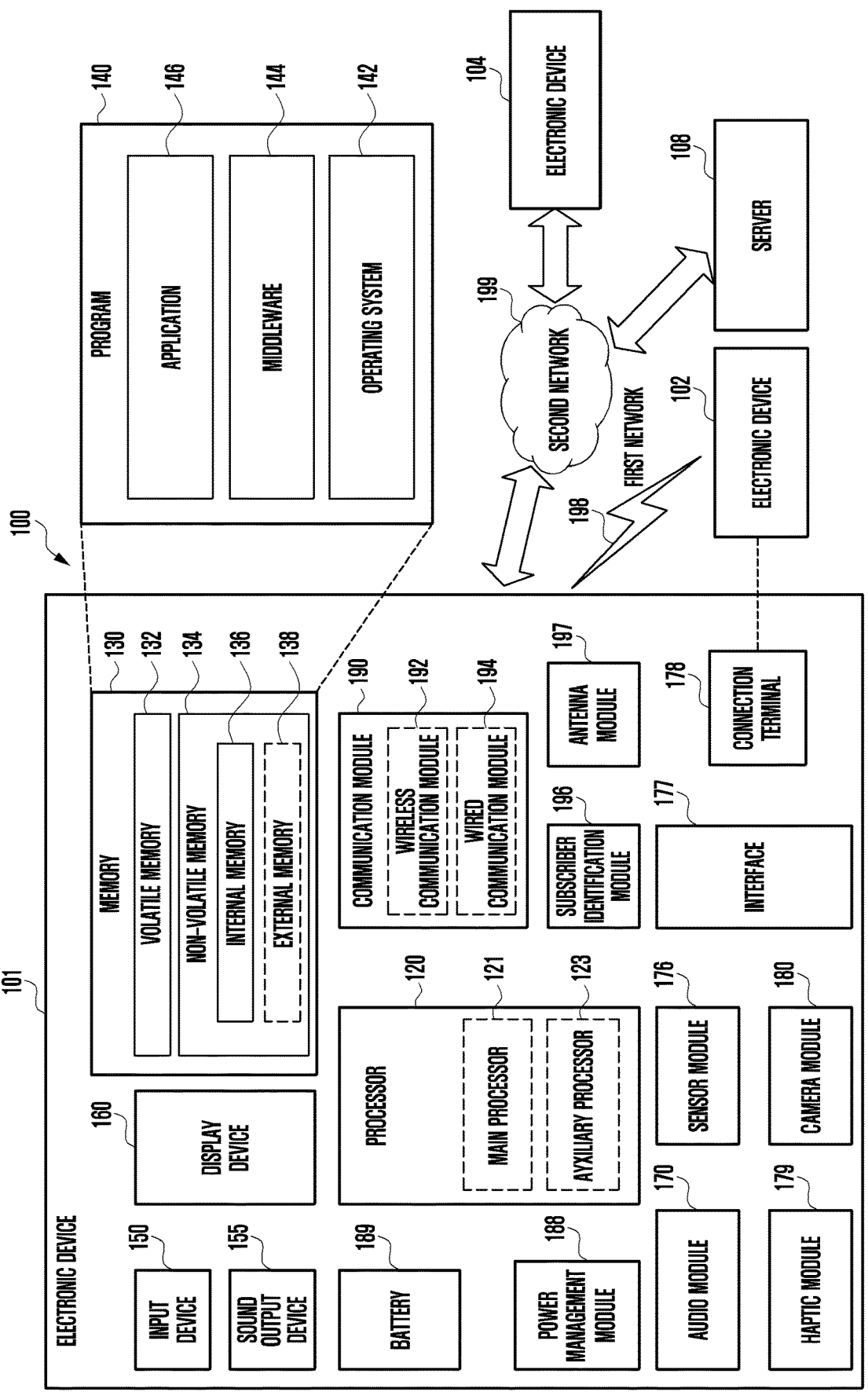
FIG. 1 illustrates an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
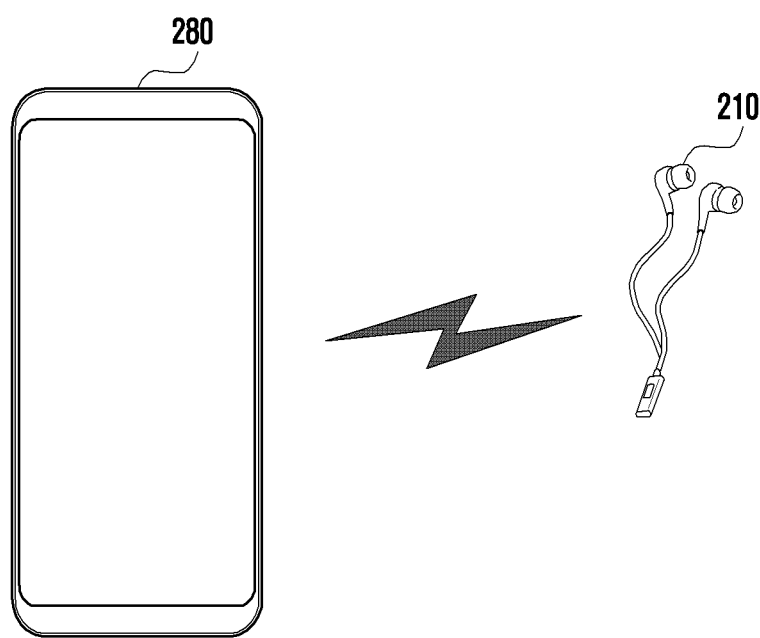
FIG. 2A illustrates an example of an audio output device according to an embodiment.
Figure 2B:
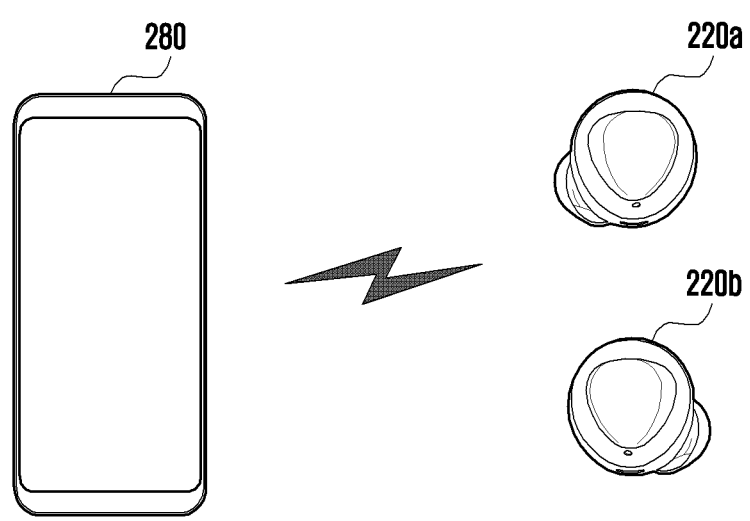
FIG. 2B illustrates an example of an audio output device according to another embodiment.

FIG. 2A illustrates an example of an audio output device according to an embodiment, and FIG. 2B illustrates an example of an audio output device according to another embodiment.

According to an embodiment, the audio output device may receive digital audio data from an electronic device 280 (e.g., the electronic device 101 of FIG. 1) using short-range wireless communication and may process the digital audio data, thereby outputting an audio sound. There is no limitation as to the configuration of the audio output device, and the audio output device may be configured as various types of wireless audio accessories, such as for example one or more speakers, earphones, headphones, or earbuds. The audio output device may include one or more audio output units to output an audio sound. According to an embodiment, since the audio output device receives audio data from the electronic device 280 using short-range wireless communication, latency may occur due to wireless transmission with the electronic device 280 and signal processing.

FIG. 2A illustrates an embodiment (e.g., earphones) in which two audio output units of an audio output device 210 are connected via a cable. Referring to FIG. 2A, the audio output device 210 may include the two audio units which a user can wear on ears, and individual components of the audio output device 210 may be connected via a cable. Accordingly, an audio signal provided from a processor (not shown) and a buffer (not shown) of the audio output device 210 to each audio output unit may not have latency due to wireless transmission, signal processing, and the like.

Although FIG. 2A shows that the audio output device 210 includes two audio output units that the user can wear on his or her ears, certain embodiments illustrated herein may be applied to an audio output device 210 (e.g., a wireless speaker) having only one audio output unit.

An embodiment in which an audio output device 210 includes only one audio output unit or a plurality of audio output units connected to each other via a cable will be described in detail with reference to FIG. 3 to FIG. 8.

FIG. 2B illustrates an embodiment (e.g., earbuds) in which an audio output device 220 includes a first audio output device 220a and a second audio output device 220b which are physically and electrically separated from each other. Referring to FIG. 2B, the first audio output device 220a and the second audio output device 220b may transmit and receive audio data to and from each other using short-range wireless communication. Since the first audio output device 220a and the second audio output device 220b are wirelessly connected, not only latency may occur due to short-range wireless communication with the electronic device 280 but the output timings of audio data output from the first audio output device and audio data output from the second audio output device may also not match. Accordingly, the first audio output device 220a may operate as a master, and the second audio output device 220b may operate as a slave, thereby synchronizing the output timings of the output audio data with each other.

The embodiment in which the audio output device 220 includes a plurality of audio output devices 220a and 220b that are physically separated and are wirelessly connected to each other will be described in detail with reference to FIG. 9 to FIG. 13. However, the embodiment described with reference to FIG. 3 to FIG. 8 and the embodiment described with reference to FIG. 9 to FIG. 13 are not independent of each other, technical features illustrated in FIG. 3 to FIG. 8 may also be applied to the embodiment described with reference to FIG. 9 to FIG. 13, and technical features illustrated in FIG. 9 to FIG. 13 may also be applied to the embodiment described with reference to FIG. 3 to FIG. 8.

Hereinafter, certain embodiments in which the different types of audio output devices as illustrated in FIG. 2A and FIG. 2B are optimized for sound interruption and/or latency by dynamically adjusting the capacity of the buffer memory based on the operating mode of the electronic device providing the audio data are described.

Figure 3:
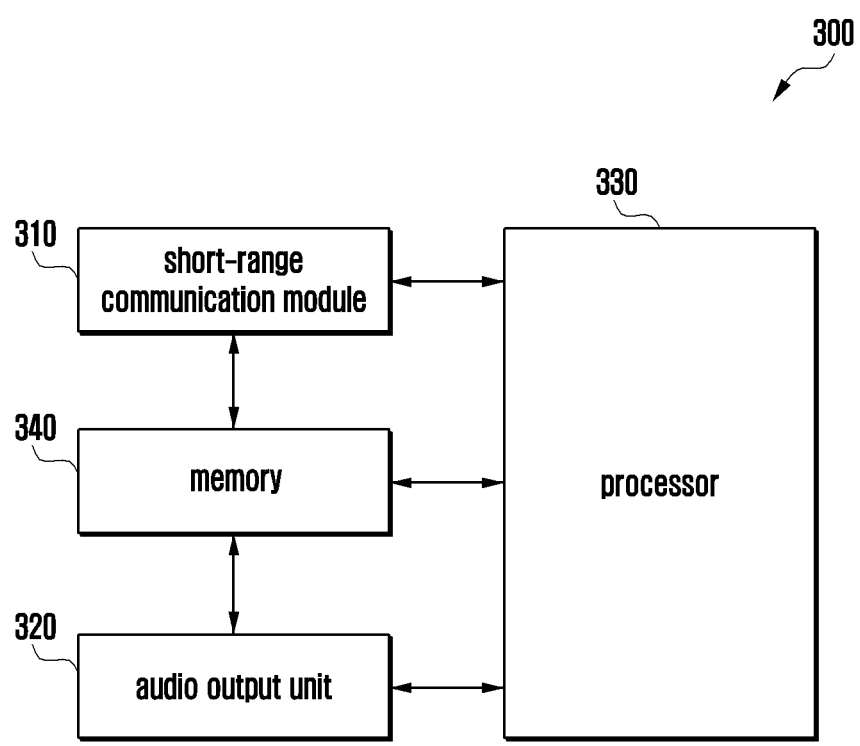
FIG. 3 is a block diagram illustrating an audio output device according to an embodiment.

FIG. 3 is a block diagram illustrating an audio output device according to an embodiment.

Referring to FIG. 3, the audio output device 300 according to an embodiment may include a short-range communication module 310, an audio output unit 320, a processor 330, and a memory 340. At least some of the illustrated components can be omitted or substituted while still implementing the various embodiments disclosed herein. The audio output device 300 may be configured as the audio output device (e.g., earphones or headphones) 210 illustrated in FIG. 2A.

According to an embodiment, the short-range communication module 310 may include various components, such as an antenna for performing short-range wireless communication, an RF front end, or a communication processor. Short-range wireless communication supported by the short-range communication module 310 may include, for example, Bluetooth. Further, standard or nonstandard communication methods may be used without limitation.

The short-range communication module 310 may receive audio data from an electronic device (e.g., the electronic device 101 of FIG. 1) using short-range wireless communication and may transmit information about the operation state of the audio output device 300 (e.g., a battery state) and the like to the electronic device.

According to an embodiment, the audio output unit 320 may output audio data buffered in the memory 340 according to control of the processor 330. The audio output device 300 may include at least one audio output unit 320. For example, when the audio output device 300 includes two audio output units as shown in FIG. 2A, each audio output unit 320 may be connected to the processor 330 and the memory 340 via a cable.

According to an embodiment, the memory 340 may buffer the audio data received from the electronic device through the short-range communication module 310. The electronic device may transmit generated audio data to the audio output device 300 in real time, and audio data received by the audio output device 300 may be sequentially stored temporarily in the memory 340 and then output through the audio output unit 320. The audio output device 300 may output the audio data in the manner of first-in-first-out, and the outputted audio data may be deleted from the memory 340. In this document, the amount of audio data buffered in the memory 340 will be described in time units (e.g., ms).

According to an embodiment, the audio output device 300 may output the audio data received from the electronic device in real time through the audio output unit 320 according to a streaming method. In this case, the audio output device 300 may not immediately output the received audio data, but may store a predetermined amount of audio data in the memory 340 and may output the audio data when the predetermined amount of audio data is accumulated.

Since the audio output device 300 receives the audio data from the electronic device through short-range wireless communication, sound interruption may occur due to buffer underrun caused by a change in the wireless environment. Accordingly, the audio output device 300 may buffer a predetermined amount of audio data in the memory 340.

According to an embodiment, the audio output device 300 includes two audio output units as shown in FIG. 2A and FIG. 2B, and the user can hear the output sound by closely placing each audio output unit 320 near or in both of his or her ears. Audio sounds output from the two audio output units 320 may be the same, and different audio sounds may be output in stereo.

According to an embodiment, the processor 330 may function to control each component of the audio output device 300. To this end, the processor 330 may be electrically, functionally, and/or operatively connected to each component of the audio output device 300, such as the short-range communication module 310, the audio output unit 320, and the memory 340. The processor 330 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 330 may configure a reference period corresponding to the amount of the audio data buffered in the memory 340. The reference period may include an upper limit and a lower limit of the amount of the buffered audio data. For example, the reference period may have a range from about 100 ms to about 400 ms in the normal mode to be described later, may have a range from about 40 ms to about 120 ms in the low latency mode, and may have a range from about 150 ms to 600 ms in the high latency mode. The reference period in each mode may be changed by configuring the audio output device 300 at the time of manufacture or by user input.

According to an embodiment, the processor 330 may dynamically change the reference period. As described above, the audio output device 300 buffers the audio data in the memory 340 in order to prevent sound interruption, and time taken to accumulate the audio data in the memory 340 may be a significant cause of audio output latency. For example, when the electronic device outputs video data and audio data respectively through a display of the electronic device and the audio output device 300 according to operations of a video playback application, since the audio data is buffered in the memory 340 of the audio output device 300, delay time in outputting the audio data by the audio output device 300 may occur with respect to output of the video data by the display of the electronic device. That is, there is a trade-off relationship between the risk of sound interruption due to buffer underrun and latency in audio output. According to an embodiment, the processor 330 may dynamically change the amount of buffered audio data, that is, the reference period, according to the operation mode of the electronic device transmitting audio data, thereby performing seamless buffer management according to the operation state of the electronic device and the user's intention.

According to an embodiment, the processor 330 may receive operation mode information related to the function currently executed by the electronic device from the electronic device through the short-range communication module 310. For example, the operation mode may include a normal mode, a low latency mode, and a high latency mode.

The low latency mode may refer to a state in which the electronic device is executing a function (or application) for which real-time operation is important. For example, when the electronic device is executing an application, such as a game application, that requires user's touch input feedback in real time, the electronic device may operate in the low latency mode. When a game application is being actively executed in the foreground, the electronic device may determine to operate in the low latency mode, in which case a framework may receive and process information being executed in the game application. Alternatively, when a touch input is continuously received on the display of the electronic device or a screen of the electronic device that is turned on, it is expected that the distance between the audio output device 300 and the electronic device is very close and accordingly the wireless environment is good. Thus, the electronic device may operate in the low latency mode.

The high latency mode may operate when decrease in sound interruption is more important than real-time operation. For example, when the user listens to music via a music application while the electronic device placed in a bag or pocket, sound interruption due to the increase in the physical distance between the electronic device and the audio output device 300 may be more significantly considered than the latency in audio output.

The normal mode may refer to an operation mode for general situations other than the low latency mode and the high latency mode. For example, when absolutely low latency is not necessary unlike for game applications but some low latency is required to provide adequate sound effect feedback for, for example, user input on buttons during the time when the user is listening to music, a certain degree of low latency may be needed.

According to an embodiment, the electronic device may transmit the operation mode information to the audio output device 300 when initially pairing with the audio output device 300, when initially transmitting audio data, and/or periodically. In addition, when the operation mode is changed from the normal mode to the low latency mode or from the low latency mode to the normal mode due to execution of an application, the electronic device may transmit operation mode information to the audio output device 300.

According to an embodiment, the processor 330 may configure the reference period corresponding to the amount of the audio data buffered in the memory 340 based on the operation mode information received from the electronic device. Since real-time operation is prioritized in the low latency mode, it is necessary to reduce the amount of the audio data buffered in the memory 340 compared to that in the normal mode. Therefore, the lower limit (e.g., about 40 ms) of the reference period in the low latency mode may be lower than the lower limit (e.g., about 100 ms) of the reference period in the normal mode, and the upper limit (e.g., about 120 ms) of the reference period in the low latency mode may be lower than the upper limit (e.g., 400 ms) of the reference period in the normal mode. In addition, since decrease in the risk of sound interruption is more important than real-time operation (or latency) in the high latency mode, it is necessary to increase the amount of the audio data buffered in the memory 340 compared to that in the normal mode. Therefore, the lower limit (e.g. 150 ms) of the reference period in high latency mode may be greater than the lower limit of the reference period in the normal mode, and the upper limit (e.g. 600 ms) of the reference period in the high latency mode may be greater than the upper limit of the reference period in the normal mode.

According to an embodiment, the processor 330 may determine the playback speed of audio data to be output through the audio output unit 320 by comparing the amount of the buffered audio data with the configured reference period. For example, when the amount of the buffered audio data is greater than the upper limit of the reference period, the processor 330 may play (or acceleratedly play) the audio data at a speed faster than a reference speed. When acceleratedly playing the audio data for a certain period of time, the amount of audio data output through the audio output unit 320 and deleted from the memory 340 would be greater than the amount of audio data received from the electronic device and accumulated in the memory 340. Thus, the amount of audio data buffered in the memory 340 may be reduced due to the accelerated play. In addition, when the amount of the buffered audio data is less than the lower limit of the reference period, the processor 330 may play (or deceleratedly play) the audio data at a speed slower than the reference speed. When deceleratedly playing the audio data for a certain period of time, the amount of audio data output through the audio output unit 320 and deleted from the memory 340 is smaller than the amount of audio data received from the electronic device and accumulated in the memory 340. Thus, the amount of audio data buffered in the memory 340 may be increased due to the decelerated play. As described above, when accelerated play or decelerated play is performed for a certain period of time, the amount of the buffered audio data may be adjusted to be within the reference period. Changes in the amount of audio data during accelerated playback and decelerated playback in each mode will be described in more detail with reference to FIG. 5A to FIG. 7.

According to an embodiment, when the mode is changed, the processor 330 may configure the reference period according to the changed operation mode and may determine the playback speed of audio data by comparing the amount of the buffered audio data with the configured reference period. For example, in a change from the high latency mode or the normal mode to the low latency mode, when the amount of audio data currently buffered in the memory 340 is greater than the upper limit of the second reference period of the low latency mode, the processor 330 may accelerate playback of the audio data, thereby reducing the amount of the buffered audio data. In a change from the low latency mode to the normal mode, when the amount of audio data currently buffered in the memory 340 is less than the lower limit of the first reference period of the normal mode, the processor 330 may decelerate playback of audio data, thereby increasing the amount of the buffered audio data.

According to an embodiment, the processor 330 may perform playback at the original constant speed after a lapse of a predetermined time from the accelerated playback or decelerated playback, or may perform playback at the original constant speed when the amount of buffered audio data is changed to be within the reference period.

For example, when the mode is changed, the processor 330 may compare the amount of audio data buffered in the memory 340 with a reference period (e.g., the first reference period or the second reference period) of the changed mode (e.g., the normal mode or the low latency mode), and may accelerate or decelerate playback of audio data for a set time (e.g., five seconds) and may then switch to the normal playback. Here, the processor 330 may accelerate or decelerate the playback for a predetermined time, or may calculate time to reach the upper or lower limit of the reference period in the accelerated playback or decelerated playback in view of the difference between the amount of audio data currently buffered in the memory 340 and the upper or lower limit of the reference period and may then accelerate or decelerate the playback for a set time. Here, time for accelerated playback or decelerated playback may be in seconds (e.g., ms) or in the unit of a time index assigned to each piece of audio data.

According to another embodiment, in a change from the high latency mode or the normal mode to the low latency mode, when the amount of buffered audio data is reduced to reach the upper limit of the reference period (e.g., the second reference period) after accelerated playback of audio data, the processor 330 may terminate the accelerated playback and may play audio data at the reference speed. In a change from the low latency mode to the normal mode, when the amount of buffered audio data is increased to reach the lower limit of the reference period (e.g., the first reference period) after decelerated playback of audio data, the processor 330 may terminate the decelerated playback and may play audio data at the reference speed.

According to an embodiment, the processor 330 may accelerate or decelerate the playback at a set speed during the accelerated playback or the decelerated playback. For example, the processor 330 may play audio data by about 1.1 times the reference speed in the accelerated playback, and may play audio data by about 0.9 times the reference speed in the decelerated playback. Since the difference between the reference speed and the acceleration or deceleration is not significant, the user may not recognize the change in the playback speed.

According to an embodiment, the processor 330 may adjust the playback speed in a plurality of levels during the accelerated playback or decelerated playback. For example, in the low latency mode, the processor 330 may divide the second reference period into a constant-speed period ranging from a first lower limit to a first upper limit and an alert period ranging from a second lower limit to a second upper limit excluding the constant-speed period (e.g., from the second lower limit to the first lower limit and from the first upper limit to the second upper limit). Here, the second lower limit may be lower than the first lower limit, and the second upper limit may be greater than the first upper limit. In a change from the high latency mode or the normal mode to the low latency mode, the processor 330 may play audio data at the reference speed when the amount of buffered audio data is within the constant-speed period, may accelerate playback of audio data by first-number times (e.g., 1.1 times) the reference speed when the amount of buffered audio data is within the alert period, and may accelerate playback of audio data by second-number times (e.g., 1.2 times) the reference speed when the amount of buffered audio data exceeds the reference period. The second-number may be greater than the first-number.

This embodiment will be described in more detail with reference to FIG. 7.

According to an embodiment, in accelerated playback of audio data, the electronic device may acceleratedly process the audio data and may transmit the audio data to the audio output device 300. In decelerated playback of audio data, the audio output device 300 may deceleratedly process and output the audio data.

In accelerated playback, processing in the electronic device is advantageous in terms of not only latency but also sound interruption since the amount of information to be transmitted to the audio output device 300 within a unit time is reduced. On the contrary, in decelerated playback, processing in the electronic device is disadvantageous because the amount of information to be transmitted to the audio output device 300 within a unit time is increased.

According to an embodiment, when switching from the high latency mode or the normal mode to the low latency mode, the electronic device may transmit audio data to be acceleratedly played for a specified period of time to the audio output device 300 according to an increased tick. Here, the reason to increase the tick for transmitting audio data is that increasing the tick is advantageous in terms of decreasing the amount of data that need to be transmitted wirelessly from the electronic device to the audio output device 300, which may have a positive effect on sound interruption. In addition, data in the buffer memory 340 of the audio output device 300 is exhausted rather than that in a buffer memory of the electronic device, thereby reducing latency in outputting audio data.

This embodiment will be described in more detail with reference to FIG. 13.

According to an embodiment, when the audio output device 300 accelerates or decelerates playback of audio data, the accelerated or decelerated playback speed may be determined according to an algorithm enabling pitch to remain unchanged, and thus the user may not experience discomfort due to the accelerated or decelerated playback. For example, audio signals may be reduced (in acceleration) or increased (in deceleration) in the temporal domain while retaining spectral characteristics before acceleration or deceleration. Reducing or increasing audio signals in the temporal domain may change pitch characteristics or may allow the use to hear slow-motion sound, and using spectral characteristic information already stored makes it possible to maintain the pitch of the original sound, which reduces audio deformation.

Figure 4:
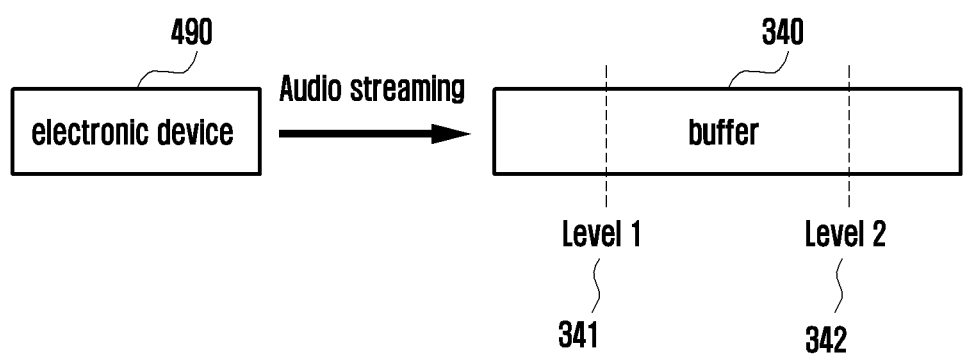
FIG. 4 illustrates a buffer memory of an audio output device according to an embodiment.

FIG. 4 illustrates a buffer memory of an audio output device according to an embodiment.

According to an embodiment, the audio output device (e.g., the audio output device 300 of FIG. 3) may store, in a memory 340, audio data received from an electronic device 490 (e.g., the electronic device 101 of FIG. 1) through short-range wireless communication (e.g., Bluetooth).

The audio data received by the audio output device may be sequentially stored temporarily in the memory 340 and then output through an audio output unit. The audio output device may output audio data in the manner of first-in-first-out, and the output audio data may be deleted from the memory 340 once they are outputted.

According to an embodiment, a processor (e.g., the processor of FIG. 3) may configure a reference period of the memory 340. Referring to FIG. 4, the reference period may be configured to be a value between a lower limit 341 (or level 1) and an upper limit 342 (or level 2) of the capacity of the memory 340.

When the electronic device 490 is paired with the audio output device and then transmits audio data to the audio output device using wireless streaming, the audio output device may output audio data through the audio output unit (e.g., the audio output unit of FIG. 3) after the amount of buffered audio data reaches the lower limit 341 of the reference period or a specified value between the lower limit 341 and the upper limit 342, rather than immediately outputting audio data.

Accordingly, even when audio data is not normally received due to the degradations in the wireless environment, buffered audio data makes it possible to prevent sound interruption.

Figure 5A:
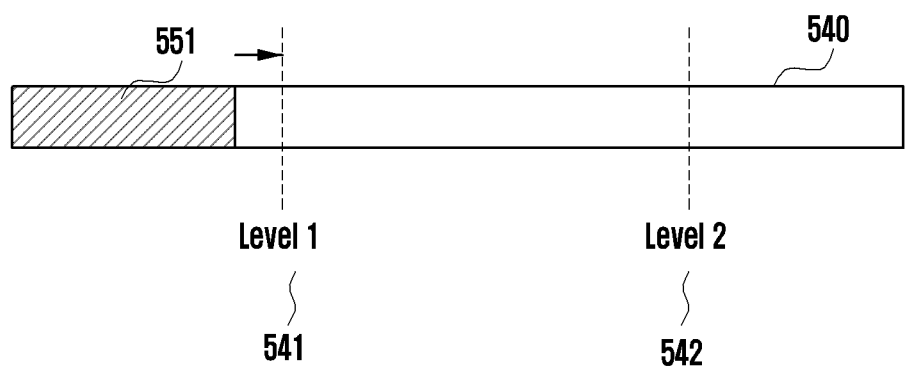
FIG. 5A illustrates an operation with a buffer memory reference period of an audio output device in a normal mode according to an embodiment.
Figure 5B:
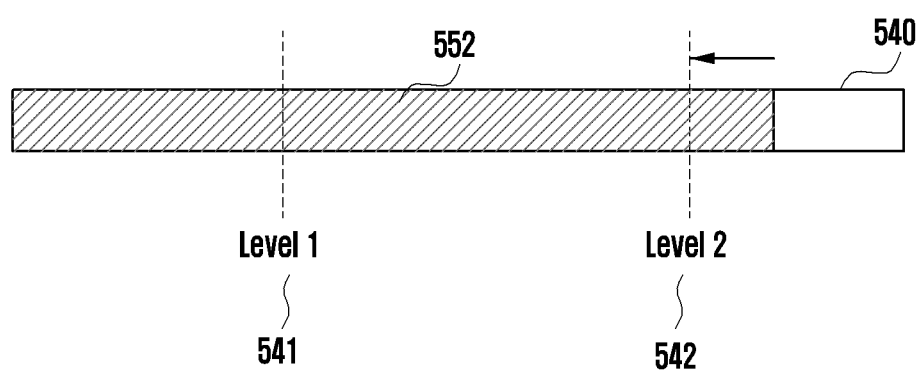
FIG. 5B illustrates another operation with a buffer memory reference period of an audio output device in a normal mode according to an embodiment.

FIG. 5A illustrates one operation with a buffer memory reference period of an audio output device in a normal mode according to an embodiment, and FIG. 5B illustrates another operation with a buffer memory reference period of an audio output device in a normal mode according to an embodiment.

According to an embodiment, the audio output device (e.g., the audio output device 300 of FIG. 3) may receive operation mode information related to a function being executed in an electronic device (e.g., the electronic device 101 of FIG. 1) from the electronic device. For example, the operation mode may include a normal mode, a low latency mode, and a high latency mode. The normal mode may refer to an operation mode for situations other than the low latency mode, in which decrease in sound interruption is more important than low latency, such as a case where a music application for which real-time operation is not important is being executed.

According to an embodiment, when the operation mode information received from the electronic device is the normal mode, the audio output device may configure a reference period of a buffer memory 540 as a first reference period. For example, the lower limit 541 of the first reference period may be configured to be about 100 ms, and the upper limit 542 may be configured to be about 400 ms. But the instant disclosure is not so limited. In a change from the low latency mode to the normal mode, the audio output device may compare the amount of buffered audio data with the reference period.

Referring to FIG. 5A, the capacity 551 of buffered audio data may be lower than the lower limit 541 (or level 1) of the reference period. In this case, the audio output device may perform decelerated playback of audio data at an output speed slower than a reference speed. Since the amount of audio data received from the electronic device per time is greater than the amount of audio data output through the audio output device due to the decelerated playback, the amount of buffered audio data may increase.

The audio output device may perform the decelerated playback for a specified time period or until the amount of buffered audio data reaches the lower limit 541 of the reference period.

Referring to FIG. 5B, the capacity 552 of buffered audio data may be greater than the upper limit 542 (or level 2) of the reference period. In this case, the audio output device may perform accelerated playback of audio data at an output speed higher than the reference speed. Since the amount of audio data received from the electronic device per time is smaller than the amount of audio data output through the audio output device due to the accelerated playback, the amount of buffered audio data may decrease.

Figure 6A:
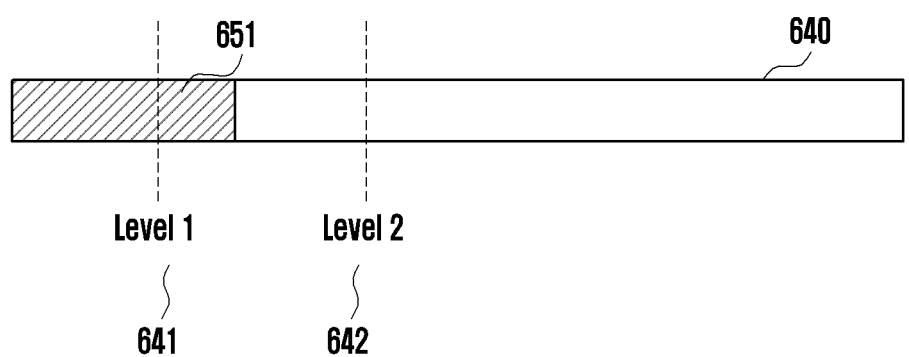
FIG. 6A illustrates an operation with a buffer memory reference period of an audio output device in a low latency mode according to an embodiment.
Figure 6B:
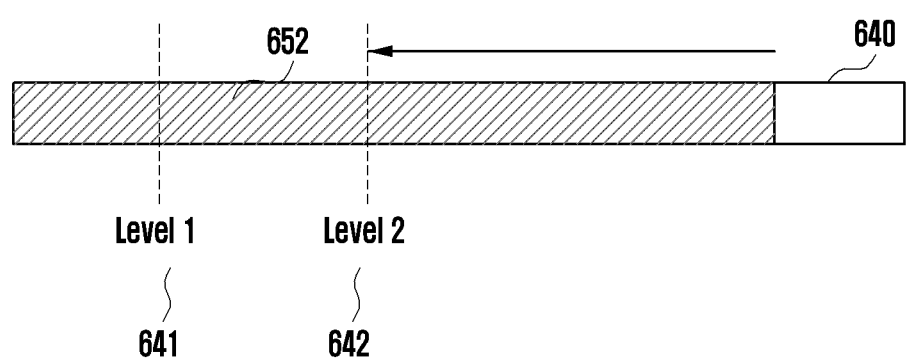
FIG. 6B illustrates another operation with a buffer memory reference period of an audio output device in a low latency mode according to an embodiment.

FIG. 6A illustrates an operation with a buffer memory reference period of an audio output device in a low latency mode according to an embodiment, and FIG. 6B illustrates another operation with a buffer memory reference period of an audio output device in a normal mode according to an embodiment.

According to an embodiment, when an electronic device (e.g., the electronic device 101 of FIG. 1) operates in the low latency mode, the audio output device (e.g., the audio output device 300 of FIG. 3) may configure a second reference period corresponding to the low latency mode based on operation mode information received from the electronic device. The low latency mode may refer to a state in which the electronic device is executing a function (or application) for which real-time operation is important. For example, when the electronic device is executing an application, such as a game application, that requires user's touch input feedback in real time, the electronic device may operate in the low latency mode. When a game application is being actively executed in the foreground, the electronic device may determine to operate in the low latency mode, in which case a framework may receive and process information being executed in the game application. Alternatively, when a touch input is continuously received on the display of the electronic device or a screen of the electronic device that is turned on, it is expected that the distance between the audio output device and the electronic device is very close and accordingly a wireless environment is good. Thus, the electronic device may operate in the low latency mode.

According to an embodiment, when the operation mode information received from the electronic device is the low latency mode, the audio output device may configure a reference period of the buffer memory 640 as a second reference period. For example, the lower limit (or level 1) of the second reference period may be configured to be about 40 ms, and the upper limit (or level 2) thereof may be configured to be about 120 ms. But the instant disclosure is not so limited. In a change from a normal mode to the low latency mode, the audio output device may compare the amount of buffered audio data with the reference period.

Referring to FIG. 5A and FIG. 6A, the same audio data capacity 651 is less than the lower limit 541 of the reference period in the normal mode, but may be within the reference period in the low latency mode since the lower limit 641 of the reference period in the low latency mode is lower than that in the normal mode. Accordingly, in FIG. 6A, the audio output device may maintain playback of audio data at the constant speed in the low latency mode.

Referring to FIG. 5B and FIG. 6B, for the same audio data capacity 652, the same capacity may have exceeded the reference period in the low latency mode to a greater extent than in the normal mode. Accordingly, in FIG. 6B, the audio output device may accelerate playback of audio data for a longer time until the audio data capacity reaches the upper limit 642 of the reference period as compared to the normal mode.

According to an embodiment, when the electronic device operates in a high latency mode, the audio output device may configure a third reference period corresponding to the high latency mode based on the operation mode information received from the electronic device. Here, the lower limit (e.g., about 150 ms) of the third reference period may be higher than the lower limit of the first reference period in the normal mode and the lower limit of the second reference period in the low latency mode, and the upper limit (e.g., about 600 ms) of the third reference period may be higher than the upper limit of the first reference period in the normal mode and the upper limit of the second reference period in the low latency mode.

Figure 7:
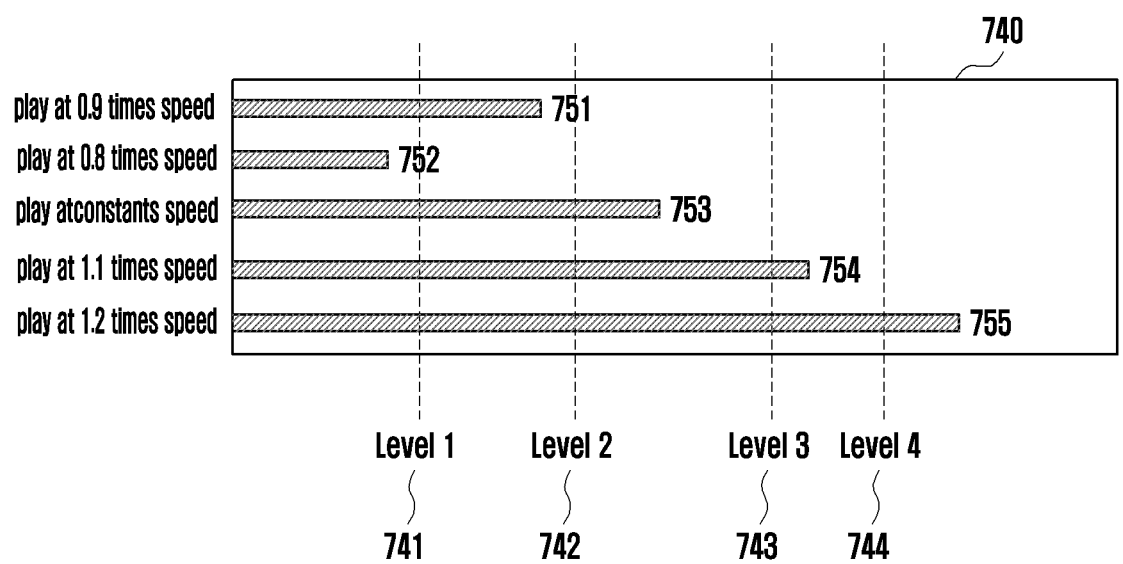
FIG. 7 illustrates a case where a reference period of a buffer memory of an audio output device is configured in a plurality of levels according to an embodiment.

FIG. 7 illustrates a case where a reference period of a buffer memory of an audio output device is configured in a plurality of levels according to an embodiment.

According to an embodiment, the audio output device (e.g., the audio output device 300 of FIG. 3) may adjust a playback speed in a plurality of levels in accelerated playback or decelerated playback.

Referring to FIG. 7, a second lower limit (or level 1) 741, a first lower limit (or level 2) 742, a first upper limit (or level 3) 743, and a second upper limit (or level 4) 744 may be configured for the capacity of the buffer memory 740, a period ranging from the first lower limit 742 to the first upper limit 743 may be configured as the constant-speed period, and a period ranging from the second lower limit 741 to the second upper limit 744 excluding the constant-speed period (e.g., from the second lower limit 741 to the first lower limit 742 and from the first upper limit 743 to the second upper limit 744) may be configured as an alert period.

According to an embodiment, the audio output device may identify the amount of audio data currently buffered in the memory 740, and may maintain the playback speed of audio data at the reference speed when the amount of the audio data belongs to the constant-speed period (from the first lower limit 742 to the first upper limit 743). When the amount of the currently buffered audio data ranges from the second lower limit 741 to the first lower limit 742 in the alert period, the audio output device may output audio data at a first deceleration (e.g., 0.9 times the reference speed) 751, and when the amount of the currently buffered audio data ranges from the first upper limit 743 to the second upper limit 744, the audio output device may output audio data at a first acceleration (e.g., 1.1 times the reference speed) 754. When the amount of the buffered audio data is less than or equal to the second lower limit 741 outside the reference period, the audio output device may output audio data at a second deceleration (e.g., 0.8 times speed the reference speed) 752, and when the amount of the buffered audio data is equal to or greater than the second upper limit 744, the audio data may output audio data at a second acceleration (e.g., 1.2 times the reference speed) 755.

According to an embodiment, when outputting audio data at the second acceleration (e.g., 1.2 times the reference speed) 755, the audio output device may reduce the output speed to the first acceleration (e.g., 1.1 times the reference speed) 754 if the amount of the buffered audio data reaches the second upper limit 744, and may output audio data at the constant speed 753 if the amount of the buffered audio data reaches the first upper limit 743. Alternatively, the audio output device may output audio data at the second acceleration 755 until the amount of the audio data reaches the first upper limit 743 in the constant-speed period.

Figure 8:
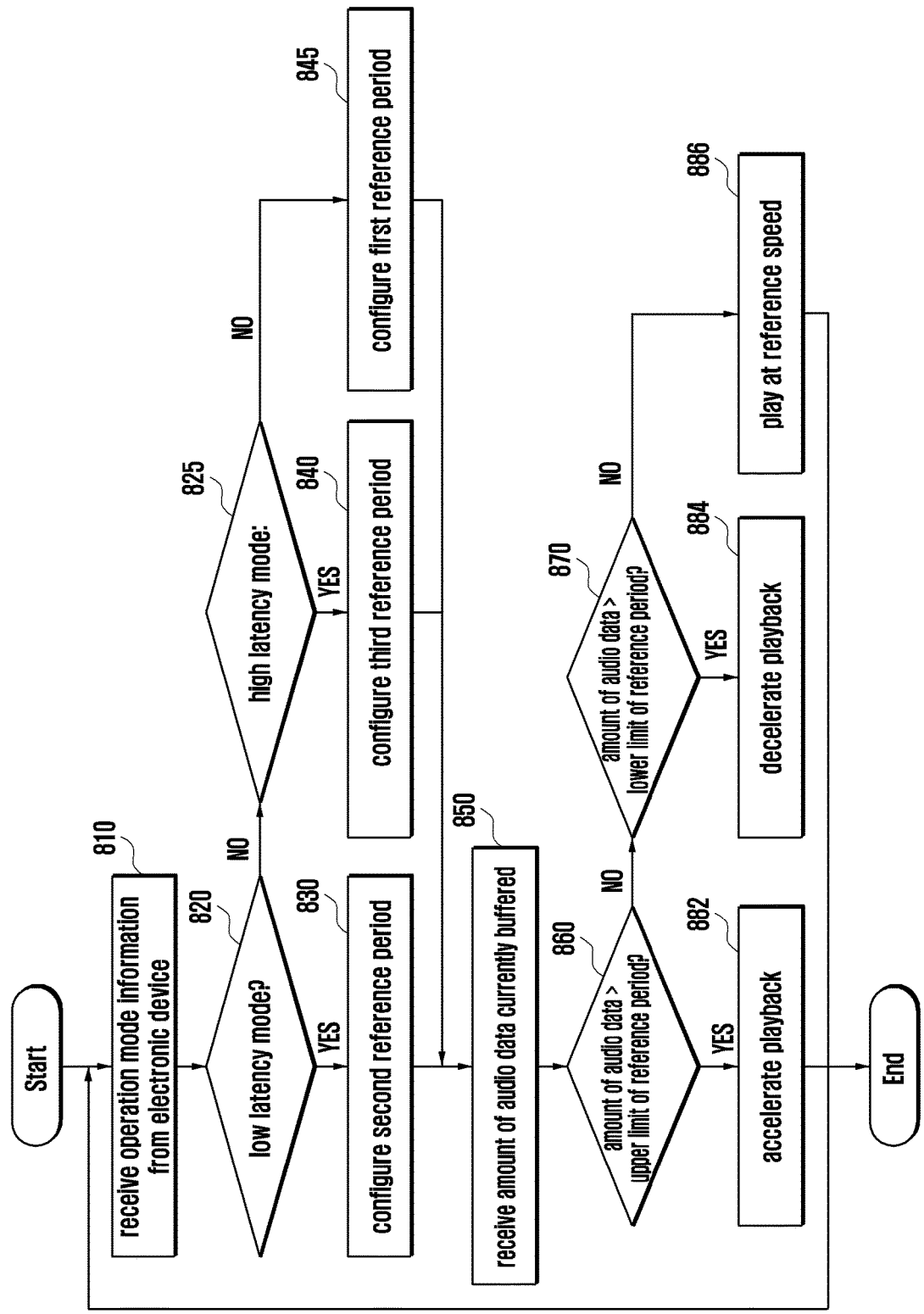
FIG. 8 is a flowchart illustrating a method for controlling an audio output speed according to an embodiment.

FIG. 8 is a flowchart illustrating a method for controlling an audio output speed according to an embodiment.

The method illustrated in FIG. 8 may be performed by the audio output device (e.g., the audio output device 300 of FIG. 3) described above with reference to FIG. 3 to FIG. 7, and a description of the technical features described above will be omitted below.

In operation 810, the audio output device may receive operation mode information related to a function being executed in an electronic device (e.g., the electronic device 101 of FIG. 1) from the electronic device through a short-range communication module (e.g., the short-range communication module 310 of FIG. 3). For example, the operation mode may include a normal mode and a low latency mode. The electronic device may transmit the operation mode information to the audio output device when initially pairing with the audio output device, when initially transmitting audio data, and/or periodically.

In operation 820, the audio output device (e.g., the processor 330 of FIG. 3) may identify whether the operation mode of the electronic device is the low latency mode. Here, the low latency mode may be configured in at least one of the following instances: when the electronic device executes a specified application (e.g., a game application), when a display of the electronic device is turned on, or when the electronic device receives a touch input on the display. In addition, the low latency mode may be configured in various situations in which real-time operation is important.

When the current operation mode is the low latency mode in operation 820, the audio output device may configure the reference period as a second reference period in operation 830.

In operation 825, the audio output device may determine whether the operation mode of the electronic device is a high latency mode. Here, the high latency mode may be configured when decrease in the risk of sound interruption is more important than latency in audio output (e.g., when the electronic device is distant from the audio output device with a music application being executed).

When the current operation mode is the high latency mode in operation 825, the audio output device may configure the reference period as a third reference period in operation 840.

When the current operation mode is the normal mode (e.g., when the operation mode is not the low latency mode in operation 820 and when the operation mode is not the high latency mode in operation 825), the audio output device may configure the reference period corresponding to the amount of audio data buffered in the memory as a first reference period in operation 845.

In operation 850, the audio output device may receive and identify the amount of audio data currently buffered in the memory (e.g., the memory 340 of FIG. 3).

In operation 860, the audio output device may identify whether the amount of the buffered audio data is greater than an upper limit of the reference period (e.g., the first reference period, the second reference period, or the third reference period).

When the amount of the buffered audio data is greater than the upper limit of the reference period, the audio output device may perform accelerated playback of audio data in operation 882. Here, the audio output device may accelerate playback of audio data for a set time (e.g., about five seconds) and may then play audio data at the reference speed (e.g. normal speed), or may accelerate playback of audio data until the amount of the buffered audio data is reduced to reach the upper limit of the reference period.

In operation 870, the audio output device may identify whether the amount of the buffered audio data is smaller than a lower limit of the reference period.

When the amount of the buffered audio data is smaller than the lower limit of the reference period, the audio output device may perform decelerated playback of audio data in operation 884. Here, the audio output device may decelerate playback of audio data for a set time and may then play audio data at the reference speed, or may decelerate playback of audio data until the amount of the buffered audio data is increased to reach the lower limit of the reference period.

When the amount of the buffered audio data is within the reference period, the audio output device may continuously play audio data at the reference speed (e.g. normal speed) in operation 886.

Figure 9:
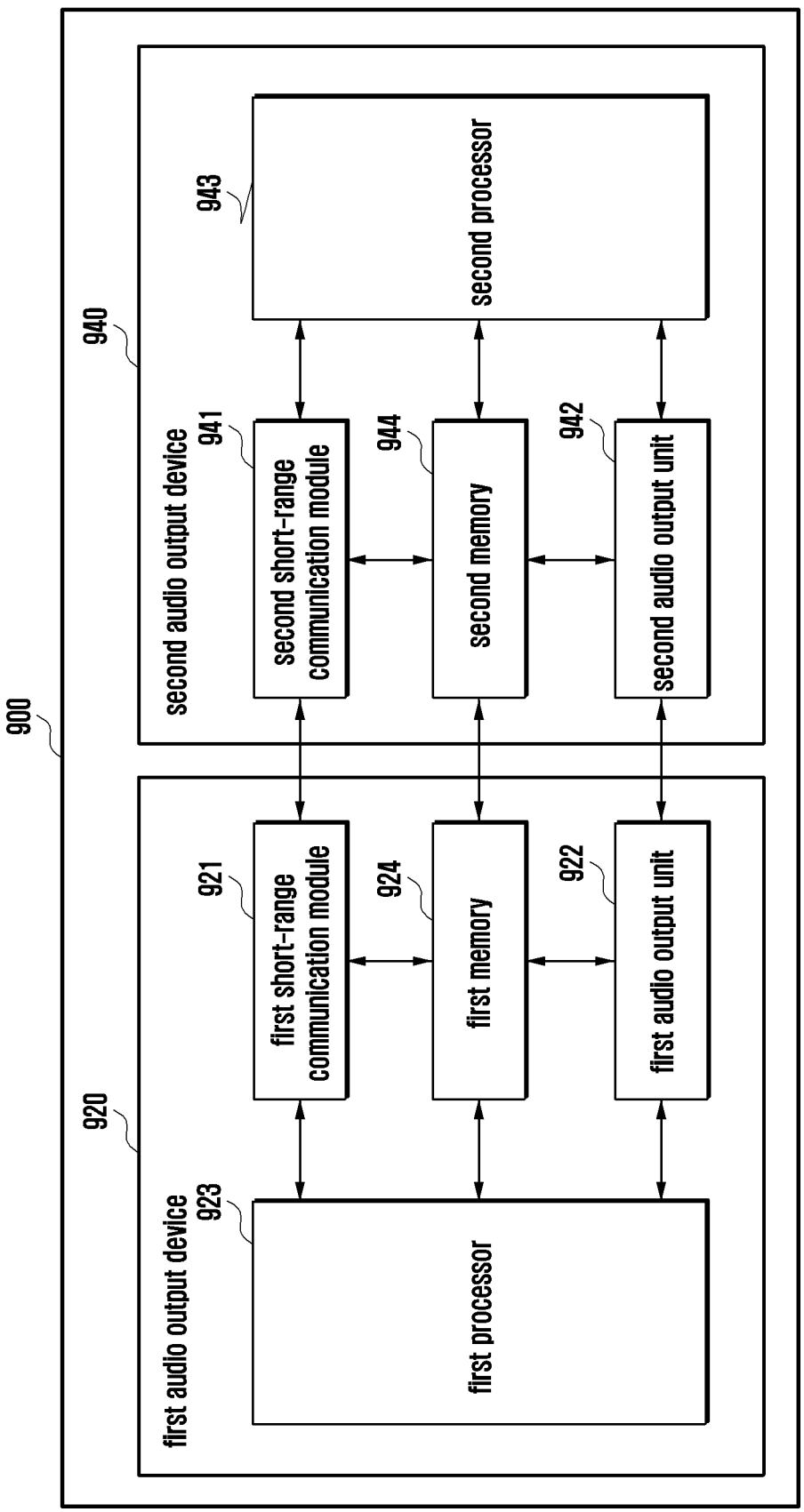
FIG. 9 is a block diagram illustrating a first audio output device and a second audio output device according to an embodiment.

FIG. 9 is a block diagram illustrating a first audio output device and a second audio output device according to an embodiment.

FIG. 9 illustrates components of an audio output device in an embodiment in which the audio output device (e.g., the audio output device 220 of FIG. 2B) includes a first audio output device 920 and a second audio output device 940 which are physically and electrically separated. Hereinafter, a description of the technical features described above with reference to FIG. 3 to FIG. 8 will be omitted below. The audio output device may be configured as earbuds illustrated in FIG. 2B.

Referring to FIG. 9, the audio output device according to an embodiment may include the first audio output device 920 and the second audio output device 940. The first audio output device 920 may include a first short-range communication module 921, a first audio output unit 922, a first processor 923, and a first memory 924, and the second audio output device 940 may include a second short-range communication module 941, a second audio output unit 942, a second processor 943, and a second memory 944. The first audio output device 920 may be worn on the user's right ear, the second audio output device 940 may be worn on the user's left ear, and the first audio output device 920 and the second audio output device 940 may have the same or corresponding external shape.

According to an embodiment, the first audio output device 920 may operate as a master, and the second audio output device 940 may operate as a slave. For example, the first audio output device 920 may receive audio data from an electronic device and may transmit audio data and reference time information for audio output timing synchronization to the second audio output device 940. According to another embodiment, the first audio output device 920 and the second audio output device 940 may each receive audio data from the electronic device.

According to an embodiment, the first audio output device 920 may buffer first audio data received from the electronic device in the first memory 924 and may output audio data through the first audio output unit 922. The second audio output device 940 may buffer second audio data received from the electronic device or the first audio output device 920 in the second memory 944 and may transmit audio data through the second audio output unit 942.

Since the first audio output device 920 and the second audio output device 940 are wirelessly connected, both audio output timing synchronization and the possibility of buffer underrun need to be considered when adjusting the audio playback speed. For example, there may be a scenario in which the first audio output device 920 may perform accelerated playback of audio data and the second audio output device 940 may play audio data at a slower speed, and when different amounts of audio data are buffered respectively in the first memory 924 and the second memory 944, sound interruption may occur due to buffer underrun in one of the first memory 924 or the second memory 944 may occur when it has a lower buffer level but still is in accelerated playback. To this end, the audio output device may perform comparison with a reference speed and playback speed control in view of both the capacity of the first memory 924 and the capacity of the second memory 944 in order to prevent buffer underrun while synchronizing the output timings of the first audio output unit 922 and the second audio output unit 942.

The audio output device according to an embodiment may configure a reference period in consideration of both the amount of audio data buffered in the first memory 924 of the first audio output device 920 and the amount of audio data buffered in the second memory 944.

According to an embodiment, the first processor 923 may receive the amount of the second audio data buffered in the second memory 944 from the second short-range communication module 941 through the first short-range communication module 921. In addition, the first processor 923 may identify the amount of the first audio data buffered in the first memory 924. The first processor 923 may compare the lower of the amount of the first audio data buffered in the first memory 924 and the amount of the second audio data buffered in the second memory 944 with the reference period.

According to an embodiment, the first processor 923 may transmit, to the second audio output device 940, reference time information about a time to start increasing or decreasing the playback speed of the first audio data through the first short-range communication module 921. Audio data streamed in real time may be assigned a time index per predetermined frame, and the first audio output device 920 and the second audio output device 940 may synchronize the audio output timings based on the time index. The reference time information may be a criterion for determining whether to increase or decrease the playback speed of audio data when the time index reaches a specified time index. In addition, since it takes time to receive operation mode information from the electronic device, to determine the playback speed, and to communicate with the second audio output device 940, the first processor 923 may generate the reference time information in view of an offset time. For example, the reference time information may be a value of the time index of time at which the operation mode information is received plus offset time information. Here, the offset time is provided in view of time to perform data processing for changing the playback speed based on information received from the first processor 923 or the second processor 943 and may be predetermined when the audio output device is manufactured.

According to another embodiment, the electronic device may generate reference time information and may transmit the reference time information to the first audio output device 920 and the second audio output device 940. In this case, the first audio output device 920 and the second audio output device 940 may respectively provide the amount of audio data buffered in the first memory 924 and the amount of audio data buffered in the second memory 944 to the electronic device.

According to an embodiment, when the operation mode information is received from the electronic device and the operation mode is changed (e.g., from a normal mode to a low latency mode or from the low latency mode to the normal mode), the first processor 923 may configure a reference period according to the operation mode. The first processor 923 may compare the lower of the amount of the first audio data buffered in the first memory 924 and the amount of the second audio data buffered in the second memory 944 with the reference period, and may generate reference time information about the time to start decelerated playback of the first audio data when the lower amount is less than a lower limit of the reference period. Subsequently, the first processor 923 may play the first audio data at the reference speed, and may decelerate playback of the first audio data for a specified time period when the time index of the received first audio data reaches the reference time information. According to another embodiment, the first processor 923 may compare a higher value of the amount of the first audio data buffered in the first memory 924 and the amount of the second audio data buffered in the second memory 944 with the reference period. For example, when decelerated playback is required according to a change in operation mode of the electronic device (e.g., a change from the low latency mode to the normal mode or a high latency mode or a change from the normal mode to the high latency mode), the first processor 923 may compare the higher value of the amount of the first audio data and the amount of the second audio data with the reference period.

According to an embodiment, the second processor 943 may receive the reference time information from the first audio output device 920 through the second short-range communication module 941. The second processor 943 may play the second audio data at the reference speed, and may decelerate playback of the second audio data for a specified time period when the time index of the received second audio data reaches the reference time information.

According to another embodiment, the second processor 943 may generate reference time information based on the lower value (or higher value) of the amount of the first audio data and the amount of the second audio data. Since the time indexes are synchronized and applied in the first audio output device 920 and the second audio output device 940, and the same offset time is also configured, the reference time information determined respectively by the first processor 923 and the second processor 943 may be the same.

According to an embodiment, the first processor 923 may determine the time to accelerate or decelerate playback of audio data according to a comparison of the lower of the amount of the first audio data buffered in the first memory 924 and the amount of the second audio buffered in the second memory 944 with an upper or lower limit of the reference period. For example, the first processor 923 may calculate time taken for the lower of the amount of the first audio data buffered in the first memory 924 and the amount of the second audio buffered in the second memory 944 to reach the lower limit of the reference period in decelerated playback, thereby determining time to decelerate playback.

Figure 10:
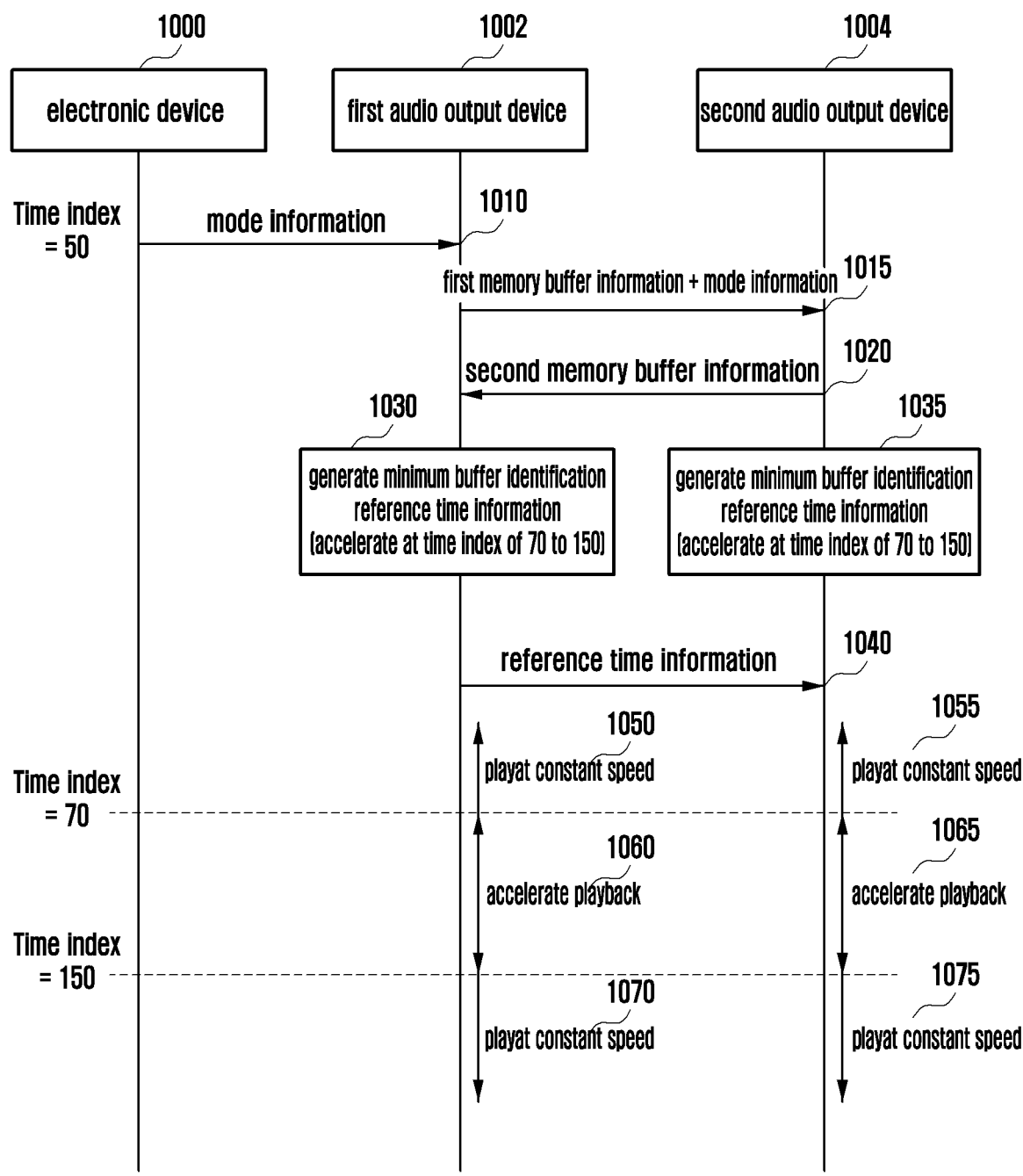
FIG. 10 illustrates the operations of an electronic device, a first audio output device and a second audio output device according to an embodiment.

FIG. 10 illustrates the operations of an electronic device, a first audio output device and a second audio output device according to an embodiment.

The method illustrated in FIG. 10 may be performed by the audio output device described above with reference to FIG. 9. Hereinafter, when an electronic device 1000 is changed from a normal mode to a low latency mode while being connected to an audio output device through short-range communication and playing audio data at a constant reference speed, the operation of each device will be described.

In operation 1010, when the mode of the audio output device is changed from the normal mode to the low latency mode, the electronic device 1000 (e.g., the electronic device 101 of FIG. 1) may transmit operation mode information to a first audio output device 1002 (e.g., the first audio output device 920 of FIG. 9). The first audio output device 1002 may configure a reference period of a buffer memory to the second reference period according to the changed low latency mode.

Here, for the sake of illustrating a concrete example, time index is assumed to be 50.

In operation 1015, the first audio output device 1002 may transmit the operation mode information to a second audio output device 1004, may identify the amount of first audio data buffered in a first memory, and may transmit the amount of the first audio data to the second audio output device.

In operation 1020, the first audio output device 1002 may identify the amount of second audio data buffered in a second memory.

In operation 1030, the first audio output device 1002 may identify the amount of the first audio data buffered in the first memory and may identify the lower of the amount of the first audio data buffered in the first memory and the amount of the second audio data buffered in the second memory. According to another embodiment, when decelerated playback of audio data is required (e.g., when the electronic device 1000 is changed from the normal mode or the low latency mode to the high latency mode), the second audio output device 1004 may also identify the amount of the second audio data buffered in the second memory and may identify the lower of the amount of the second audio data buffered in the second memory and the amount of the first audio data buffered in the first memory. Since the first audio output device and the second audio output device each select the lower amount by comparing the amount of the first audio data buffered in the first memory of the first audio output device with the amount of the second audio data buffered in the second memory of the second audio output device, the target capacity of the buffer determined in the first audio output device and the target capacity of the buffer determined in the second audio output device may be the same.

The first audio output device 1002 may compare the identified lower amount (referred to as the minimum buffer or Min buffer) with the second reference period corresponding to the low latency mode. When the identified lower value is greater than an upper limit of the second reference period, the first audio output device 1002 may determine that accelerated playback is required.

The first audio output device 1002 may generate reference time information about the time to start accelerated playback of audio data. For example, the reference time information may be the value of the time index of time when the operation mode information is received plus an offset time required for the first audio output device and the second audio output device to exchange information with each other, and the offset time may be the time necessary for processing, such as receiving the operation mode information from the electronic device 1000, determining a playback speed, and communicating with the second audio output device 1004 and may be predetermined. Here, the reference time information may include information about timing (e.g., time index=70) to start accelerated playback based on the time index and timing (e.g., time index=150) to terminate accelerated playback and to switch to constant-speed playback. In this case, because the time index at operation 1010 is assumed to be 50, the offset time may be 20.

The timing (e.g., time index=150) to switch to constant-speed playback may vary depending on the accelerated playback speed and the decelerated playback speed. For example, the time index, which is 150 at an acceleration of 1.1, may be changed to 130 at an acceleration of 1.2.

In operation 1035, the second audio output device 1004 may identify the lower of the amount of the first audio data and the amount of the second audio data and may generate reference time information based on the lower amount. Since the time indexes are synchronized and applied in the first audio output device 1002 and the second audio output device 1004, and the same offset time is also configured, and the reference time information determined respectively by the first audio output device 1002 and the second audio output device 1004 may be the same. According to an embodiment, the second audio output device 1004 may adjust the playback speed according to the reference time information received from the first audio output device 1002, rather than directly generating reference time information, in which case operation 1035 may be omitted.

In operation 1040, the first audio output device 1002 may transmit the generated reference time information to the second audio output device 1004. Operation 1040 may be omitted when the second audio output device 1004 generates reference time information (e.g., operation 1035). When operation 1040 is omitted, the first audio output device and the second audio output device may each calculate the same reference time information based on the accelerated and decelerated playback speeds and buffer information about the first audio output device and the second audio output device, which were previously exchanged between the first audio output device 1002 and the second audio output device 1004.

In operation 1050, even though accelerated playback is determined and the reference time information is generated, the first audio output device 1002 may maintain constant-speed playback at normal playback speed until the time index reaches the time index 70 which is the determined reference time information. Likewise, in operation 1055, the second audio output device 1004 may also maintain constant-speed playback.

In operation 1060, when the time index reaches the time index 70, the first audio output device 1002 may accelerate playback of the first audio data at a specified speed (e.g., 1.1 times a reference speed). Likewise, the second audio output device 1004 may accelerate playback of the second audio data at the same speed.

In operation 1070, when the time index reaches a time index 150, the first audio output device 1002 may terminate the accelerated playback and may play the first audio data back at the constant normal speed. Likewise, the second audio output device 1004 may terminate the accelerated playback of the second audio data and play the second audio data at the constant normal speed.

Figure 11:
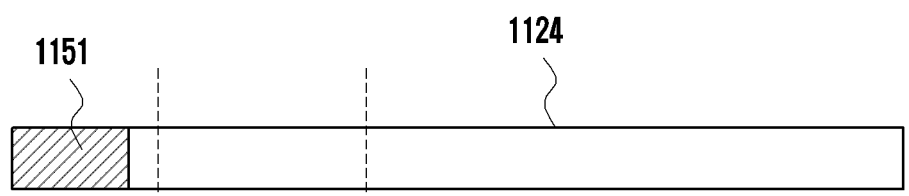
FIG. 11 illustrates reference periods of buffer memories of a first audio output device and a second audio output device according to an embodiment.
Figure 11:
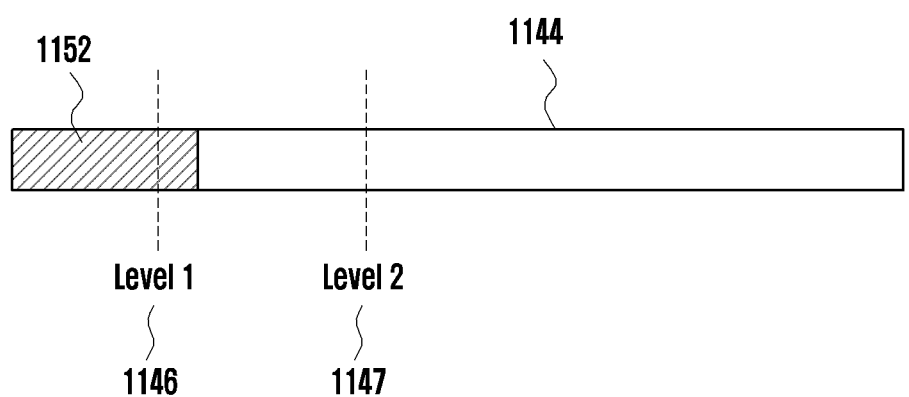

FIG. 11 illustrates reference periods of buffer memories of a first audio output device and a second audio output device according to an embodiment.

According to an embodiment, the first audio output device (e.g., the first audio output device 920 of FIG. 9) may buffer first audio data received from an electronic device in a first memory 1124, and the second audio output device (e.g., the second audio output device 940 of FIG. 9) may buffer second audio data received from the electronic device or the first audio output device in a second memory 1144.

According to an embodiment, the first audio output device (e.g., a first processor) may receive the amount of the second audio data buffered in the second memory 1144 of the second audio output device through a first short-range communication module, may identify the lower of the amount of the first audio data buffered in the first memory 1124 of the first audio output device and the amount of the second audio data buffered in the second memory 1144 of the second audio output device, and may compare the lower amount with a reference period corresponding to the current operation mode of the electronic device. Since the first audio output device and the second audio output device are wirelessly connected, the amounts of audio data buffered respectively in the first memory 1124 and the second memory 1114 may be different depending on wireless environments of the respective devices. For example, as shown in FIG. 11, the amount 1151 of audio data buffered in the first memory 1124 may be less than the lower limit 1126 (or level 1) of the reference period and may thus be outside the reference range, and the amount 1152 of audio data buffered in the second memory 1144 may be between the lower limit 1146 and the upper limit 1147 (or level 2) of the reference period and may thus be within the reference period. In this case, the first audio output device may identify that the lower of the amount 1151 of the first audio data buffered in the first memory 1124 and the amount 1152 of the second audio data buffered in the second memory 1144 is the amount 1151 of audio data buffered in the first memory 1124.

Here, since the identified amount is outside the reference period, the first audio output device may determine to decelerate playback of audio data, may generate reference time information for decelerated playback, and transmit the reference time information to the second audio output device. According to another embodiment, the second audio output device may generate reference time information by using the amount 1151 of the first audio data, the amount 1152 of the second audio data, and a set offset time.

Subsequently, when the reference time is reached, the first audio output device and the second audio output device may decelerate playback of audio data for a specified time interval.

An audio output device 300 according to an embodiment may include: a short-range communication module 310 configured to perform short-range wireless communication; a memory 340 configured to buffer audio data received from an external electronic device through the short-range communication module 310; an audio output unit 320 configured to output the audio data; and a processor 330 operatively connected to the short-range communication module 310, the memory 340, and the audio output unit 320, wherein the processor 330 may be configured to: receive operation mode information related to a function being executed in the external electronic device from the external electronic device through the short-range communication module 310;

configure a reference period corresponding to the amount of the audio data buffered in the memory 340 based on the operation mode information; and determine the playback speed of the audio data to be output through the audio output unit 320 unit by comparing the amount of the buffered audio data with the configured reference period.

According to an embodiment, the processor 330 may be configured to: determine the playback speed of the audio data to be a second playback speed faster than a first playback speed, which is a reference speed, when the amount of the buffered audio data is an amount corresponding to greater than an upper limit of the reference period; and determine the playback speed of the audio data to be a third playback speed slower than the first playback speed when the amount of the buffered audio data is an amount corresponding to less than a lower limit of the reference period.

According to an embodiment, the processor 330 may be configured to: output the audio data at the first playback speed when the amount of the buffered audio data reaches an amount corresponding to the upper limit of the reference period after outputting the audio data at the second playback speed; and output the audio data at the first playback speed when the amount of the buffered audio data reaches an amount corresponding to the lower limit of the reference period after outputting the audio data at the third playback speed.

According to an embodiment, when the playback speed of the audio data is determined to be the second playback speed or the third playback speed, the processor 330 may be configured to output the audio data at the second playback speed or the third playback speed for a specified time period, and to output the audio data at the first playback speed after a lapse of the specified time period.

According to an embodiment, the operation mode information may relate to a normal mode, a low latency mode, and a high latency mode.

According to an embodiment, the low latency mode may be configured when the external electronic device executes a specified application, when a display of the external electronic device is turned on, and/or when the external electronic device receives a touch input.

According to an embodiment, the high latency mode may be configured when a display of the external electronic device is turned off and/or when the display does not receive a touch input for a certain period.

According to an embodiment, the processor 330 may be configured to: compare the amount of the buffered audio data with a predetermined first reference period when the external electronic device operates in the normal mode based on the received operation mode information; compare the amount of the buffered audio data with a predetermined second reference period when the external electronic device operates in the low latency mode; and compare the amount of the buffered audio data with a predetermined third reference period when the external electronic device operates in the high latency mode.

According to an embodiment, the second reference period may have a lower limit lower than a lower limit of the first reference period and may have an upper limit lower than an upper limit of the first reference period, and the third reference period may have a lower limit higher than the lower limit of the first reference period and may have an upper limit higher than the upper limit of the first reference period.

According to an embodiment, when the external electronic device operates in the low latency mode, the processor 330 may be configured to output the audio data at a second playback speed slower than a first playback speed, which is a reference speed, when the amount of the buffered audio data is less than an amount corresponding to a first lower limit of the second reference period, and to output the audio data at a third playback speed slower than the second playback speed when the amount of the buffered audio data is less than an amount corresponding to a second lower limit lower than the first lower limit of the second reference period.

According to an embodiment, the processor 330 may be configured to: exchange the amount of first audio data buffered in the memory 340 with the amount of second audio data buffered in a memory of an external audio output device through the short-range communication module 310; and compare a lower of the amount of the buffered audio data and the amount of the second audio data buffered in the memories of the respective audio output devices with the reference period.

According to an embodiment, the processor 330 may be configured to: determine reference time information about a time to start increasing or decreasing the playback speed of the audio data; and transmit the reference time information to the external audio output device through the short-range communication module 310.

According to an embodiment, the processor 330 may be configured to increase or decrease the playback speed of the audio data when a time index reaches the reference time information.

According to an embodiment, the reference time information may be a value of a time index of a time when the operation mode information is received plus an offset time.

According to an embodiment, the processor 330 may be configured to receive acceleratedly processed audio data from the external electronic device when the amount of the buffered audio data is less than an amount corresponding to a lower limit of the configured reference period.

Figure 12:
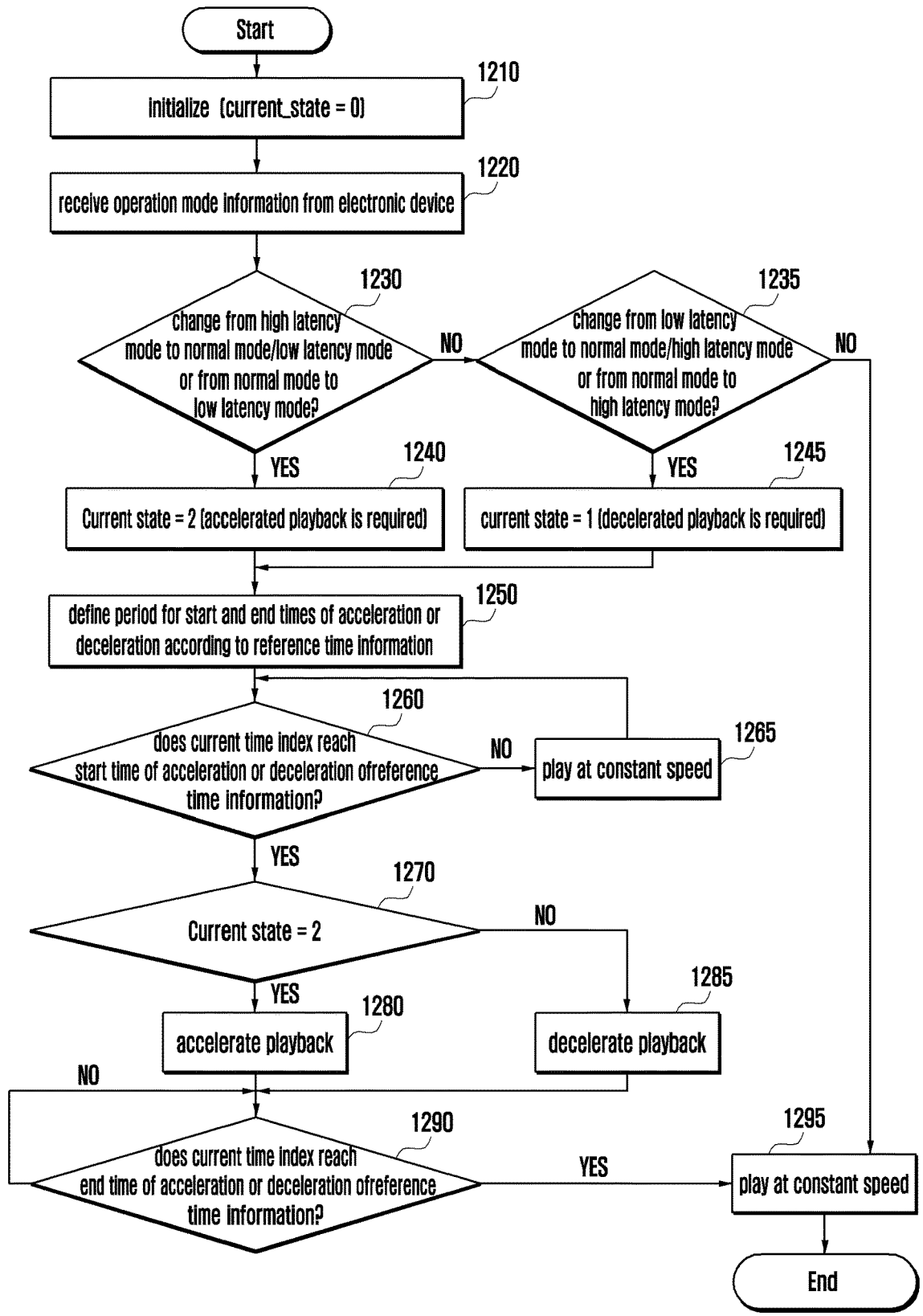
FIG. 12 is a flowchart illustrating a method for controlling an audio output speed according to an embodiment.

FIG. 12 is a flowchart illustrating a method for controlling an audio output speed according to an embodiment.

In operation 1210, an audio output device may perform an initialization operation. Here, the current state may be configured to be 0, and an audio output device may play audio data at the constant normal speed in the current state of 0.

In operation 1220, the audio output device (e.g., the audio output device 900 of FIG. 9) may receive operation mode information from an electronic device (e.g., the electronic device 101 of FIG. 1).

In operation 1230, the audio output device may identify whether the received operation mode is changed from the high latency mode to the normal mode or the low latency mode or from the normal mode to the low latency mode. For example, the electronic device, which was operating in the normal mode, may be changed to the low latency mode according to execution of a specific application or a user input, or the electronic device, which is operating was the high latency mode due to poor wireless environment between the electronic device and the audio output device during execution of a music application, may be change to the normal mode as the wireless environment is improved.

When the operation mode of the electronic device is changed from the high latency mode to the normal mode or the low latency mode or from the normal mode to the low latency mode in operation 1230, the current state may be configured to be 2 in operation 1240. Here, the current state of 2 may be a state in which accelerated playback is required according to the change in the operation mode.

In operation 1235, the audio output device may identify whether the received operation mode is changed from the low latency mode to the normal mode or the high latency mode or from the normal mode to the high latency mode. For example, when the wireless environment between the electronic device and the audio output device is deteriorated during execution of the music application, the electronic device may be changed to the high latency mode.

When the operation mode of the electronic device is changed from the low latency mode to the normal mode or the high latency mode or from the normal mode to the high latency mode in operation 1235, the current state may be configured to be 1 in operation 1245. Here, the current state of 1 may be a state in which decelerated playback is required according to the change in the operation mode.

In operation 1250, the audio output device may generate reference time information. The reference time information may be a criterion for determining whether to accelerate or decelerate playback of audio data when a specific time index is reached and may be a value of the time index of time at which the operation mode information is received plus offset time information. The audio output device may identify the lower of the amount of first audio data buffered in the first memory of a first audio output device and the amount of second audio data buffered in the second memory of a second audio output device, may compare the lower amount with the reference period of the current operation mode of the electronic device, and may determine whether to accelerate or decelerate playback according to a comparison result. According to another embodiment, when in a change to an operation mode in which decelerated playback is required (e.g., a change from the normal mode to the high latency mode), the audio output device may compare the higher of the amount of the first audio data and the amount of the second audio data with the reference period and may determine whether to decelerate playback.

According to an embodiment, the first audio output device may transmit the generated reference time information to the second audio output device, and the second audio output device may determine the timing of accelerated playback or decelerated playback according to the received reference time information. According to another embodiment, the second audio output device may generate reference time information based on the amount of the first audio data and the amount of the second audio data. Since the same offset time is configured, the reference time information generated by the first audio output device and the second audio output device may have the same start time and the same end time.

In operation 1260, the audio output device may identify whether a current time index reaches the start time of acceleration or deceleration of the reference time information. Since the reference time information is the value of the time index of the time at which the operation mode information is received plus the offset time information, the audio output device may maintain constant-speed playback until reaching the start time in operation 1265. Subsequently, the audio output device may start accelerated or decelerated playback according to the current state (e.g., 1 or 2) when reaching the start time of the reference time information.

When the current time index reaches the start time of the reference time information, the audio output device may identify whether the current state is 2 in operation 1270. Since the current state of 2 is a state in which accelerated playback is required, the audio output device may accelerate playback of audio data in operation 1280.

When the current state is 1 rather than 2, in which decelerated playback is required, the audio output device may decelerate playback of audio data in operation 1285.

In operation 1290, the audio output device may identify whether the current time index reaches the end time of the reference time information. When the end time is reached, the audio output device may play audio data back at the constant normal speed in operation 1295.

Figure 13:
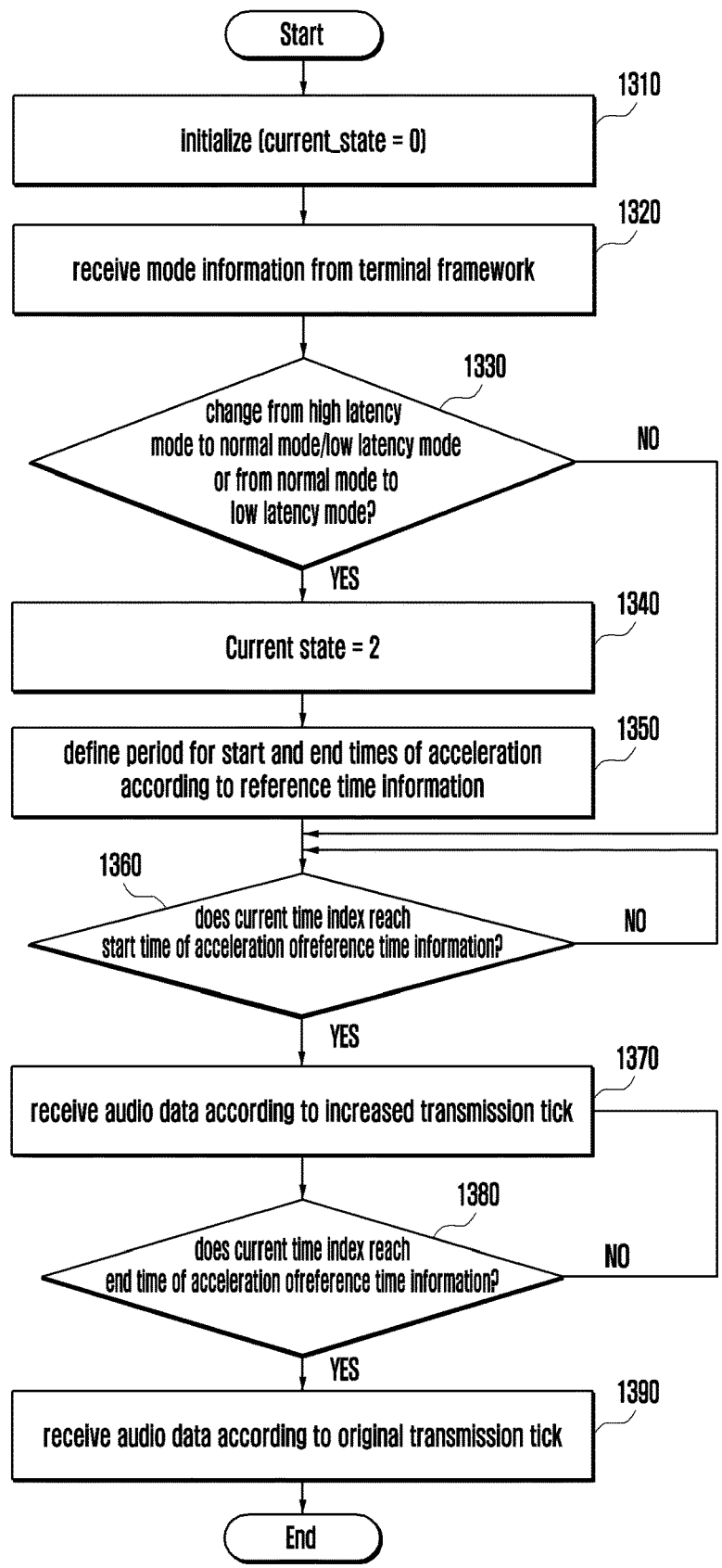
FIG. 13 is a flowchart illustrating a method for controlling an audio output speed according to an embodiment.

FIG. 13 is a flowchart illustrating a method for controlling an audio output speed according to an embodiment.

FIG. 13 illustrates an embodiment in which an electronic device performs accelerated processing of audio data and transmits the audio data to an audio output device for accelerated playback of audio data. The illustrated method may be applied to an audio output device including one audio output unit or a plurality of audio output units connected via a cable (e.g., the audio output device of FIG. 2A and the audio output device of FIG. 3) and may also be applied to an audio output device including a plurality of audio output units which are physically separated and wirelessly connected (e.g., the audio output device 220 of FIG. 2B and the audio output device 900 of FIG. 9).

In operation 1310, the audio output device may perform an initialization operation. Here, the current state may be configured to be 0, and an audio output device may play audio data at the constant normal speed in the current state of 0.

In operation 1320, the electronic device may receive operation mode information from a framework. Here, the operation mode may include a normal mode, a low latency mode, and a high latency mode.

In operation 1330, the electronic device may identify whether the high latency mode is changed to the normal mode or the low latency mode or the normal mode is changed to the low latency mode. In a change from the high latency mode to the normal mode or the low latency mode or in a change from the normal mode to the low latency mode, the current state may be configured to be 2 in operation 1340. Here, the current state of 2 may be a case in which accelerated playback is required.

In operation 1350, the electronic device may generate reference time information. Here, the reference time information may define a period for the start and end times of accelerated playback.

In operation 1360, the audio output device may identify whether the current time index has reached the start time of acceleration of the reference time information. The audio output device may receive audio data of the same transmission tick from the electronic device until the current time index reaches the start time of acceleration of the reference time information. When the current time index reaches the start time of acceleration of the reference time information, the electronic device may perform accelerated processing of audio data and may transmit the audio data to the audio output device according to an increased transmission tick. In operation 1370, the audio output device may receive and output the acceleratedly processed audio data from the electronic device.

In operation 1380, when the time index reaches the end time of acceleration of the reference time information, the electronic device may transmit audio data back at the constant normal speed according to an original transmission tick. In operation 1390, the audio output device may play the received audio data at the constant speed.

An audio output speed control method according to an embodiment may include: receiving operation mode information related to a function being executed in an external electronic device from the external electronic device through short-range communication; configuring a reference period corresponding to an amount of audio data buffered in a memory 340 based on the operation mode information; and determining a playback speed of the audio data to be output through an audio output unit 320 by comparing the amount of the buffered audio data with the configured reference period.

According to an embodiment, the determining of the playback speed may include: determining the playback speed of the audio data to be a second playback speed faster than a first playback speed, which is a reference speed when the amount of the buffered audio data is an amount corresponding to greater than an upper limit of the reference period; or determining the playback speed of the audio data to be a third playback speed slower than the first playback speed when the amount of the buffered audio data is an amount corresponding to less than a lower limit of the reference period.

According to an embodiment, the operation mode information may relate to a normal mode, a low latency mode, and a high latency mode.

According to an embodiment, the low latency mode may be configured when the external electronic device executes a specified application, when a display of the external electronic device is turned on, and/or when the external electronic device receives a touch input.

According to an embodiment, the high latency mode may be configured when a display of the external electronic device is turned off and/or when the display does not receive a touch input for a certain period.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An audio output device comprising:
a short-range communication module configured to perform short-range wireless communication;
a memory configured to buffer audio data received from an external electronic device through the short-range communication module;
an audio output unit configured to output the audio data; and
a processor operatively connected to the short-range communication module, the memory, and the audio output unit,
wherein the processor is configured to:
receive operation mode information related to a function being executed in the external electronic device from the external electronic device through the short-range communication module;
configure a reference period corresponding to an amount of the audio data buffered in the memory based on the operation mode information; and
determine a playback speed of the audio data to be output through the audio output unit by comparing the amount of the buffered audio data with the configured reference period.

2. The audio output device of claim 1, wherein the processor is further configured to:
determine the playback speed of the audio data to be a second playback speed faster than a first playback speed, which is a reference speed, when the amount of the buffered audio data is an amount corresponding to greater than an upper limit of the reference period; and
determine the playback speed of the audio data to be a third playback speed slower than the first playback speed when the amount of the buffered audio data is an amount correspond to less than a lower limit of the reference period.

3. The audio output device of claim 2, wherein the processor is further configured to:
output the audio data at the first playback speed when the amount of the buffered audio data reaches an amount corresponding to the upper limit of the reference period after outputting the audio data at the second playback speed; and
output the audio data at the first playback speed when the amount of the buffered audio data reaches an amount corresponding to the lower limit of the reference period after outputting the audio data at the third playback speed.

4. The audio output device of claim 2, wherein, when the playback speed of the audio data is determined to be the second playback speed or the third playback speed, the processor is further configured to output the audio data at the second playback speed or the third playback speed for a specified time period, and to output the audio data at the first playback speed after a lapse of the specified time period.

5. The audio output device of claim 1, wherein the operation mode information relates to a normal mode, a low latency mode, and a high latency mode.

6. The audio output device of claim 5, wherein the low latency mode is configured when the external electronic device executes a specified application, when a display of the external electronic device is turned on, and/or when the external electronic device receives a touch input.

7. The audio output device of claim 5, wherein the high latency mode is configured when a display of the external electronic device is turned off and/or when the display does not receive a touch input for a certain period.

8. The audio output device of claim 5, wherein, to compare the amount of the buffered audio data with the configured reference period, the processor is further configured to:
compare the amount of the buffered audio data with a predetermined first reference period when the external electronic device operates in the normal mode based on the received operation mode information;

compare the amount of the buffered audio data with a predetermined second reference period when the external electronic device operates in the low latency mode; and compare the amount of the buffered audio data with a predetermined third reference period when the external electronic device operates in the high latency mode.

9. The audio output device of claim 8, wherein the second reference period has a lower limit lower than a lower limit of the first reference period and has an upper limit lower than an upper limit of the first reference period, and the third reference period has a lower limit higher than the lower limit of the first reference period and has an upper limit higher than the upper limit of the first reference period.

10. The audio output device of claim 8, wherein, when the external electronic device operates in the low latency mode, the processor is further configured to output the audio data at a second playback speed slower than a first playback speed, which is a reference speed, when the amount of the buffered audio data is less than an amount corresponding to a first lower limit of the second reference period, and to output the audio data at a third playback speed slower than the second playback speed when the amount of the buffered audio data is less than an amount corresponding to a second lower limit lower than the first lower limit of the second reference period.

11. The audio output device of claim 1, wherein the processor is further configured to:

receive an amount of second audio data buffered in a memory of an external audio output device through the short-range communication module; and perform an additional comparison of comparing a lower of the amount of the buffered audio data buffered in the memory of the audio output device and the amount of the second audio data with the reference period.

12. The audio output device of claim 11, wherein the processor is further configured to transmit reference time information about a time to start increasing or decreasing the playback speed of the audio data to the external audio output device through the short-range communication module.

13. The audio output device of claim 12, wherein the processor is further configured to increase or decrease the playback speed of the audio data when a time index reaches the reference time information.

14. The audio output device of claim 12, wherein the reference time information is a value of a time index of a time when the operation mode information is received plus an offset time.

15. The audio output device of claim 1, wherein the processor is further configured to receive acceleratedly processed audio data from the external electronic device when the amount of the buffered audio data is less than an amount corresponding to a lower limit of the configured reference period.

16. A method for controlling an audio output speed, the method comprising:

receiving operation mode information related to a function being executed in an external electronic device from the external electronic device through short-range communication;

configuring a reference period corresponding to an amount of audio data buffered in a memory based on the operation mode information; and determining a playback speed of the audio data to be output through an audio output unit by comparing the amount of the buffered audio data with the configured reference period.

17. The method of claim 16, wherein the determining of the playback speed comprises:

determining the playback speed of the audio data to be a second playback speed faster than a first playback speed, which is a reference speed, when the amount of the buffered audio data is an amount corresponding to greater than an upper limit of the reference period; and/or determining the playback speed of the audio data to be a third playback speed slower than the first playback speed when the amount of the buffered audio data is an amount corresponding to less than a lower limit of the reference period.

18. The method of claim 16, wherein the operation mode information relates to a normal mode, a low latency mode, and a high latency mode.

19. The method of claim 18, wherein the low latency mode is configured when the external electronic device executes a specified application, when a display of the external electronic device is turned on, and/or when the external electronic device receives a touch input.

20. The method of claim 18, wherein the high latency mode is configured when a display of the external electronic device is turned off and/or when the display does not receive a touch input for a certain period.

* * * * *